Patented Mar. 10, 1942

2,276,187

UNITED STATES PATENT OFFICE 2,276,187

ACYL DERIVATIVES OF AZO DYESTUFFS, AND PROCESS OF PREPARING SAME

Charles Graenacher, Riehen, Franz Ackermann, Binningen, and Heinrich Bruengger, Basel, Switzerland, assignors to Society of Chemical Industry in Basle, Basel, Switzerland No Drawing. Application November 7, 1939, Serial No. 303,322. In Switzerland August 17, 1935

8 Claims. (Cl. 260—203)

The present invention relates to a new process for converting into acyl derivatives water-insoluble azo-dyestuffs obtained from diazo-compounds and arylides from aromatic hydroxycarboxylic acids, which acyl derivatives are characterized by an increased solubility in water. This invention comprises the new process, as well as the new acyl derivatives of the insoluble azo-dyestuffs from diazo-compounds and arylides from aromatic hydroxy-carboxylic acids.

It has been found that quite generally the water-insoluble azo-dyestuffs which are described in the literature in great number and are obtained from diazo-compounds and arylides from aromatic hydroxy-carboxylic acids, can be converted into new acyl derivatives which are characterized by their solubility in water, by causing these water-insoluble azo-dyestuffs to react in the presence of tertiary bases with acylating agents which are derived from organic acids containing more than one salt-forming group, which group itself is selected from the group consisting of carboxyl groups and sulfonic groups.

The azo-dyestuffs serving as parent materials in the present invention may belong to the series of the mono-, dis- or polyazo-dyestuffs. They may be obtained from the diazo-compounds of various amines of the benzene and of the naphthalene series, and it is explicitly pointed out that this expression includes also polynuclear diazotizing bases in which the aromatic nuclei which may belong to the naphthalene or the benzene series are united to one another by bridges, for example the diphenyl linkage, the —CH=CH—, —CH$_2$—, —O—, —NH—, —NH—CO—NH—, —NHCO—,

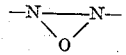

—N=N— linkages, and linkages which are in the one case connected twice and in the ortho-position to one and the same aromatic ring and in the other case once to the other aromatic ring, such as

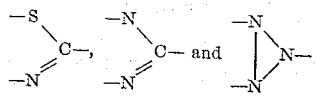

etc. Therefore, such diazotizing bases are also benzidine, dianisidine, 4:4'-diamino-diphenyl urea, monobenzoyl-para-phenylene-diamine, aminoazobenzene, aminobenzene-azo-naphthalene and the like.

As coupling components—arylides of aromatic hydroxy carboxylic acids—may be used for example such components which are derived from aromatic hydroxy-carboxylic acids of the benzene series, for instance the arylides of the phenol-, cresol-, xylenol- and chlorocresol-carboxylic acids, and which are constituted in such a manner that they react with diazo-compounds to form ortho-hydroxyazo-dyestuffs. Particularly suitable arylides are derived from polynuclear aromatic hydroxy-carboxylic acids. Such arylides are for example the arylides of the 2:3-hydroxynaphthoic acids, of the 1:4-hydroxynaphthalene carboxylic acid or of the 2:3-hydroxy-anthracene carboxylic acid; further the arylides of the hydroxycarbazole-carboxylic acids or of the naphthocarbazole-carboxylic acids which are to be regarded as aromatic hydroxy-carboxylic acids, since the OH-group and the COOH-group are linked to aromatic nuclei. Such arylides are obtained by condensing in a known manner the above mentioned carboxylic acids with various amines of the benzene and of the napthalene series, and it is explicitly pointed out that this expression includes also polynuclear primary amines in which the aromatic nuclei are united to one another by bridges, for example the diphenyl linkage, the —CH=CH—, —CH$_2$—, —O—, —NH—, —NH—CO—NH—, —NHCO—,

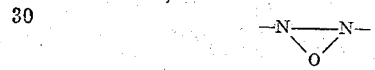

—N=N— linkages, and linkages which are in the one case connected twice and in the ortho-position to one and the same aromatic ring and in the other case once to the other aromatic ring, such as

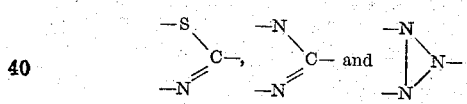

Reference is made moreover to the numerous publications in the literature relating to such arylides and to the insoluble azo-dyestuffs derived therefrom, further also to the examples and the tabulated summary which follow further below.

Acylating agents deriving from organic acids which contain more than one salt-forming group selected itself from the group consisting of carboxyl groups and sulfonic groups, are for example halides of aliphatic, hydroaromatic or aromatic carboxylic acids which contain sulfonic groups or carboxyl groups. These groups can be transformed after the action of the acylating agents on the dye into water-soluble metal salts or ammonium salts. As examples of acylating agents deriving from organic acids which contain more than one salt-forming group selected itself from the group consisting of carboxyl groups and sulfonic groups, there may be mentioned halides of polycarboxylic acids, such as for example benzene-1:3:5-tricarboxylic acid, benzene hexacarboxylic acid, and polysulfonic acids, such as for example 1:3-benzene-disulfonic acid, 1:3:6-naphthalenetrisulfonic acid: further there are quite particularly suitable halides of sulfo-carboxylic acids in which both the sulfonic group and the carboxyl group are in the form of their halides, and those in which only the sulfonic groups or only the carboxyl groups are in the form of their halides. Examples of such compounds are the halides of the sulfobenzoic acids, of the sulfo-naphthoic acids, of the sulfo-acetic acid, and the like.

The acylation itself is carried out in the presence of a tertiary base which is also preferably used as reaction medium. Among the tertiary bases those are particularly suitable which are heterocyclic tertiary nitrogen bases for instance pyridine, picoline, quinoline, acridine, thiazol, 2:4-dimethylthiazol or benzothiazol, of which the nitrogen atom is a member of the heterocyclic ring to which it is linked by a simple bond, on the one hand, and by a double bond, on the other. For carrying out the reaction the halides of the above mentioned acids or the analogues thereof need not be isolated. On the contrary, the reaction product of a phosphorus halide, such as for example phosphorus trichloride or pentachloride, on the corresponding acids may be used directly. One may also proceed in such a manner that a solution of the azo-dyestuff and the polyvalent acid is treated in the tertiary base with phosphorus pentachloride or phosphorus trichloride. Under these conditions of reaction also other hydrogen atoms than those of the OH-groups, for instance such of the —CO—NH— groups present, may be acylated.

The new products are therefore acyl derivatives of azo-dyestuffs which are themselves free from carboxyl groups and sulfonic groups and are characterized by the atomic grouping

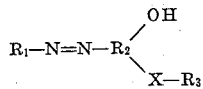

wherein $R_1$ and $R_3$ stand for mononuclear or polynuclear radicals, the nuclei of which are of the benzene and/or naphthalene series and, in the case of the polynuclear radicals, are interconnected by one or more suitable bridges such as the diphenyl linkage, the —CH=CH—, —CH$_2$—, —O—, —NH—, —NH—CO—NH—, —NHCO—, —N=N—,

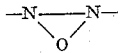

linkages, the triazine nucleus, and linkages which are in the one case connected twice and in the ortho-position to one and the same aromatic ring and in the other case once to the other aromatic ring, such as

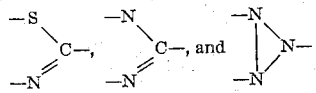

etc., $R_2$ stands for the nuclear radical of an aromatic hydroxy-carboxylic acid, and $x$ stands for one of the two tautomeric forms

and

the carbon atom being linked to $R_2$, and wherein the azo-group and the OH-group stand in ortho-position to each other, in which acyl derivatives at least the two hydrogen atoms explicitly shown in the above formulation are replaced by the acyl radical of an organic acid which contains more than one salt-forming group from the group consisting of carboxyl and sulfonic groups, which acyl derivatives form alkali salts which are soluble in water with formation of solutions from which the insoluble parent azo-dyestuff can be precipitated by treatment with alkalies. These new products are characterized by the solubility of their salts in water, and by the property of regenerating the insoluble parent dyestuffs merely by the action of saponifying agents.

The derivatives obtainable by the invention give valuable transformation products, and can be used for dyeing the most varied materials, for example vegetable fibres, animal fibres, such as wool, silk, leather, or artificial fibres, such as regenerated cellulose or cellulose derivatives, and artificial masses.

They are more or less readily soluble in water. Their aqueous solutions or suspensions may be used for dyeing and printing any desired material in such a manner that the goods, after having been dyed, padded or printed by known processes, are subjected to a saponifying treatment for example with alkalis or agents developing basic substances, such as ammonia, sodium carbonate, caustic soda solution, trisodium phosphate or alkali acetate, whereby the dye initially acylated is fixed as a pigment on the material, and in particular is rendered fast to washing. The saponification of the acylated dyestuffs can also be effected in lacquers and artificial masses. In many cases the treatment with saponifying agents can be applied in the dyeing operation.

If dyes are used which can form metallic complexes, a treatment with a compound yielding a metal can be applied before, during or after the saponification on the fiber, in the dyebath, in lacquers and artificial masses or to the dye in substance, whereby a metalliferous pigment is deposited on the fiber or in the material, or the dye in substance is converted into a metalliferous pigment.

In contradistinction to the soluble acyl derivatives of the leuco-compounds of vat dyes, the derivatives produced by this invention need no oxidizing agent for their development.

The following examples illustrate the invention, the parts being by weight:

*Example 1*

12.6 parts of the azo-dye (melting point 262–263° C.) produced by coupling diazotized 1-aminonaphthalene and 2:3-hydroxynaphthoic acid anilide are dissolved by boiling in the necessary quantity of pyridine. The solution is cooled to 80° C. and 19.2 parts of the dichloride of meta-sulfobenzoic acid are poured in. A brown solution is formed. A test portion of the solution, removed even after a short time, does not revert to the parent dye when poured into water, but after stirring gives a perfectly clear solution. After stirring for an hour, the main part of the pyridine is distilled in a vacuum and the residue of the distillation is triturated with a little hot water to remove the more easily soluble products. The washing fluid, after cooling, contains very little of the acylated derivative, and is thrown away, and the residue is again washed with a little water and then dried in a vacuum at 100° C. A solid dark product is obtained which dissolves in water to a brown-red solution. The probable formula of the new product is

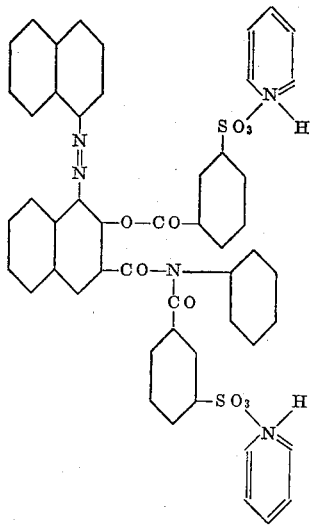

It is also possible, both here and in regard to all formulas given hereafter, that the acid amide grouping has reacted as enol, so that the product has perhaps the formula

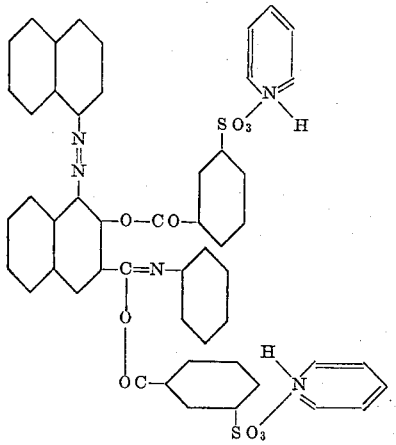

This remark, therefore, refers to all formulas mentioned hereafter. A hot solution of the acylated derivative reverts completely after adding alkali, to the parent dye, which, after recrystallizing from toluol has the original melting point of 262–263° C.

*Example 2*

19.2 parts of 3:5-benzoic acid disulfochloride are added to 100–120 parts of pyridine and 9.2 parts of the azo-dye produced by coupling diazotized 4-chloro-ortho-toluidine and 2:3-hydroxynaphthoic acid-2-methyl-4-methoxy-anilide are added. After heating quickly to 70–90° C. with thorough stirring the reaction is complete in about 10 minutes and the product is readily soluble in water. The main part of the pyridine is now distilled in a vacuum and the residue of the distillation is dissolved in a little water. By pouring the solution, if desired neutralized with sodium phosphate, into cold saturated brine the product is precipitated after some time, and the pure solid product can be obtained from the solid saline product of the probable formula

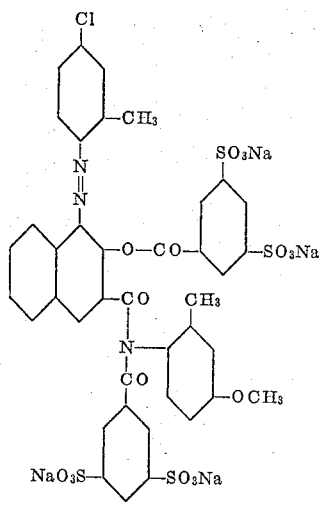

by extraction with alcohol. It is readily soluble in cold water and reverts to the parent dye on addition of alkali.

*Example 3*

100 parts of the azo-dyestuff derived from diazotised 2:5-dichloraniline and the ortho-anisidide of 2:3-oxy naphthoic acid are suspended in 400 parts of pyridine, while the temperature of the mixture is raised at the same time to about 100° C. 130 parts of melted benzoyl chloride meta-sulphonic acid (prepared by sulphonation of benzoyl chloride with $SO_3$) are now allowed to run in gradually, whereupon the temperature of the mixture rises to the boiling point of the pyridine on account of the heat evolved by the reaction.

The reaction mixture is maintained for about one hour at 95–100° C. with stirring, after which period the acylation is completed, which is recognizable by the fact that a sample of the mixture is completely soluble in cold water to a clear solution. The pyridine is now removed by distillation in vacuo at 50° C. The residue is taken up in a warm mixture of 1800 parts water and 140 parts crude concentrated hydrochloric acid at 35–40° C. from which solution the acylation product may be salted out by addition of 190 parts sodium chloride. By redissolving and salting out again the product may be obtained in the form of a brick-red powder, free from pyridine salts, which gives a clear solution in water, from which solution, on addition of caustic alkalies, the insoluble parent-dyestuff is again quickly precipitated, even in the cold.

*Example 4*

5.5 parts of the dyestuff obtained from diazotised 4-amino-4-ethoxydiphenylamine and 2:3-oxynaphthoic acid β-naphthylamide are introduced into 60 parts of pyridine, then 9.6 parts benzoic acid disulphochloride are added and the reaction mixture is heated to 80–90° C. After a reaction time of 1½ hours, a sample of the reaction mixture is clearly soluble in water. The acylation is then complete. The pyridine is evaporated in vacuo at 80° C., the residue dissolved in 250 parts of cold water, made slightly alkaline with sodium carbonate solution, and again acidified with acetic acid.

The solution thus standardised is again evaporated and the residue extracted with methyl alcohol, whereby the acylation product is obtained in the form of an orange-coloured powder, which is readily soluble in water to a clear, orange coloured solution. The aqueous solution, on addition of caustic soda, quickly turns to a bluish-red colour in the cold, and, on heating, the insoluble blue-violet parent-pigment is deposited.

*Example 5*

13.2 parts of the meta-sulfonic acid of benzoyl-chloride, 80 parts of pyridine and 5.2 parts of the azo-dye obtained from 1-aminonaphthalene-4-sulfonic acid and 2:3-hydroxynaphthoic acid anilide are heated together to 80° C. for an hour, whereupon the derivative of the slightly soluble dye dissolves readily in water. The pyridine is then distilled in a vacuum, the residue of the distillation is treated with water and the product is salted out of the aqueous solution. By extracting the precipitate with methyl alcohol the ester of the hydroxyazo dye of the probable formula

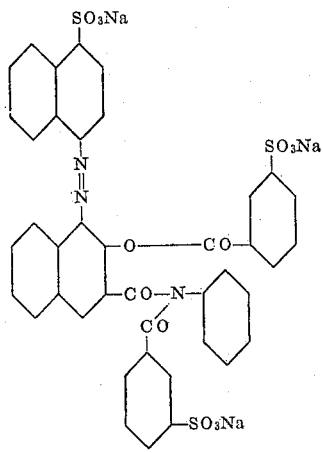

is obtained in pure form. It is readily soluble in water to a red-brown solution, and reverts to the parent dye on saponification with dilute alkali.

*Example 6*

8.8 parts of benzoic acid-3-sulfochloride and 4.2 parts of the azo-dyestuff from diazotized 1-aminonaphthalene and 2:3-hydroxynaphthoic acid anilide are heated together to about 110–120° C. for 1–2 hours in 26 parts of quinoline, while stirring. After this time the bluish red color of the reaction mixture has changed into a yellow brown which is due to the acylation which has taken place. The mixture is then poured into dilute hydrochloric acid whereby the sparingly soluble quinoline salt of the acylation product is precipitated as a brown substance. The aqueous solution is decanted and the residue evaporated to dryness in a vacuum.

The product of the probable formula

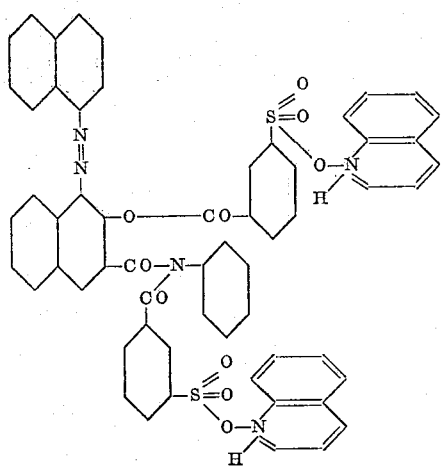

represents a brown powder which dissolves fairly easily in dilute ammonia to a brown solution. This solution becomes immediately turbid on heating due to the decomposition to the insoluble parent azo-dyestuff.

*Example 7*

8.8 parts of benzoic acid-3-sulfochloride and 4.2 parts of the azo-dyestuff from diazotized 1-aminonaphthalene and 2:3-hydroxynaphthoic acid anilide are heated together to about 110–120° C. for 1–2 hours in 27 parts of benzothiazol, while stirring. The blue-red color of the reaction mixture changes thereby to a yellow brown due to acylation.

The reaction mixture is then poured into dilute hydrochloric acid whereby the acylation product is precipitated in resinous form as benzothiazol salt which is sparingly soluble in water. The aqueous solution is decanted and the residue dried in a vacuum.

The reaction product is a brown powder which dissolves in dilute ammonia to a brown solution. On heating this solution the insoluble parent azo-dyestuff which has been reformed by saponification is again precipitated.

The following table gives the particulars of further products which can be produced by this invention:

| | Azo dyestuff | Acylating agent | Color of aqueous solution |
|---|---|---|---|
| 1 | 1-naphthylamine → 2:3-hydroxynaphthoic acid-anilide | Benzoic acid-3-sulfochloride | Red-brown. |
| 2 | 2:5-dichloraniline → 2:3-hydroxynaphthoic acid anilide | do | Orange-red. |
| 3 | do | Benzoic acid-3:5-disulfochloride | Orange-red. |
| 4 | Aminochloranisol (OCH₃NH₂Cl:1,2,4) → 2:3-hydroxynaphthoic acid-ortho-anisidide | Benzoic acid-3-sulfochloride | Red. |
| 5 | Nitrotoluidine (CH₃NH₂NO₂:1,2,4) → 2:3-hydroxynaphthoic acid-anilide | do | Orange. |
| 6 | Aminochloranisol (OCH₃NH₂Cl:1,2,4) → 2:3-hydroxynaphthoic acid-ortho-anisidide | Benzoic acid-3:5-disulfochloride | Red. |
| 7 | 4-(4'-methyl)-phenoxyacetylamino-2:5-diethoxy-1-aminobenzene → 2:3-hydroxynaphthoic acid-anilide | Benzoic acid-3-sulfochloride | Brown. |
| 8 | do | Benzoic acid-3:5-disulfochloride | Brown. |
| 9 | 4-benzoylamino-2:5-diethoxy-1-aminobenzene → 2:3-hydroxynaphthoic acid-anilide | do | Brown. |
| 10 | 4'-chloro-2-aminodiphenylether-4-carboxylic acid-diethylamide → 2:3-hydroxynaphthoic acid-ortho-anisidide | do | Red. |
| 11 | 1-methoxy-2-aminobenzene-4-diethyl-sulfamide → 2:3-hydroxynaphthoic acid-2:4-dimethoxy-5-chloranisidide | do | Red. |
| 12 | Chlortoluidine (CH₃NH₂Cl:1,2,4) → 2-hydroxycarbazole-3-carboxylic acid-para-chloranilide | Benzoic acid-3:5-disulfochloride | Brown. |
| 13 | 2:5-dichloraniline → 2:3-hydroxynaphthoic acid-ortho-anisidide | do | Orange. |
| 14 | do | Benzoic acid-3-sulfochloride | Orange-red. |

| | Azo dyestuff | Acylating agent | Color of aqueous solution |
|---|---|---|---|
| 15 | 4:4'-diaminodiphenylcarbamide ⟶ 2:3-hydroxynaphthoic acid-anilide | ___do___ | Brown-red. |
| 16 | 4-chlorbenzene-azo-4'-amino-3'-methoxynaphthalene ⟶ 2:3-hydroxynaphthoic acid-anilide | ___do___ | Brown-black. |
| 17 | 2-methyl-4:4'-diamino-5-methoxyazobenzene ⟶ 2:3-hydroxynaphthoic acid-anilide | Benzoic acid-3:5-disulfochloride | Red-brown. |
| 18 | 4:4'-diaminodiphenylmethane ⟶ 2:3-hydroxynaphthoic acid-anilide | Benzoic acid-3-sulfochloride | Orange-red. |
| 19 | 4:4'-diaminodiphenylether ⟶ 2:3-hydroxynaphthoic acid-anilide | ___do___ | Red. |
| 20 | 1-aminonaphthalene ⟶ anilide of 2:3-hydroxynaphthoic acid | 1:3:6-naphthalene-trisulfochloride | Brown. |
| 21 | Meta-chloraniline ⟶ anilide of 2:3-hydroxynaphthoic acid | Benzene-1:3:5-tricarboxylic acid chloride. | Orange. |
| 22 | ___do___ | Benzenehexacarboxylic acid-chloride. | Orange. |
| 23 | ___do___ | Naphthoic acid-disulfochloride | Orange. |
| 24 | 3-chloranilide ⟶ anilide of 2:3-hydroxynaphthoic acid | 1:3:6-naphthalene-trisulfonic acid-chloride. | Orange. |
| 25 | 4-(4'-methyl)-phenoxyacetylamino-2:5-dimethoxy-1-aminobenzene ⟶ anilide of 2:3-hydroxynaphthoic acid. | Furane-α:α'-sulfocarboxylic acid chloride. | Brown. |
| 26 | 2:5-dichloraniline ⟶ α-naphtho-carbazole-5-hydroxy-ortho-carboxylic acid-ortho-toluidide. | Benzoic acid 2:5-disulfochloride | Brown. |
| 27 | Nitrotoluidine (CH₃.NH₂.NO₂:1,2,4) ⟶ α-naphthocarbazole-3-hydroxy-ortho-carboxylic acid-anilide. | ___do___ | Brown. |
| 28 | Nitroanisidine (OCH₃.NH₂.NO₂:1,2,4) ⟶ 2-hydroxycarbazole-3-carboxylic acid-ortho-toluidide. | Benzoic acid-3-sulfochloride | Brown. |
| 29 | Nitroanisidine (NH₂.OCH₃.NO₂:1,2,4) ⟶ 2-hydroxycarbazole-3-carboxylic acid-para-chloranilide. | ___do___ | Brown. |
| 30 | 4-chloro-2-amino-1:1'-diphenylether ⟶ 4-hydroxydiphenyl-3-carboxylic acid-para-chloranilide. | ___do___ | Brown. |
| 31 | Aminonitro-chlorobenzene (NH₂.NO₂Cl:1,2,4) ⟶ 3-hydroxydiphenylene-oxide-2-carboyxlic acid-4'-chloro-2'-methoxyanilide. | ___do___ | Brown. |
| 32 | Nitrotoluidine (NH₂.NO₂.CH₃:1,2,4) ⟶ 3-hydroxydiphenylsulfide-2-carboxylic acid-4'-chloro-2'-methoxy-anilide. | ___do___ | Brown. |
| 33 | 4:4'-diamino-3:3'-dimethoxydiphenyl ⟶ anilide of 2:3-hydroxynaphthoic acid | ___do___ | Brown. |
| 34 | 4-aminoazo-benzene ⟶ α-naphthylamide of the 2:3-hydroxynaphthoic acid | ___do___ | Brown. |
| 35 | 4'-amino-2-methoxybenzene-azo-naphthalene ⟶ β-naphthylamide of the 2:3-hydroxynaphthoic acid. | ___do___ | Brown. |
| 36 | Chlorotoluidine (NH₂.CH₃.Cl:1,2,5) ⟶ β-naphthylamide of the 2:3-hydroxy naphthoic acid. | ___do___ | Brown-red. |
| 37 | Chlorotoluidine (NH₂.CH₃.Cl:1,2,4) ⟶ anilide of the 1:4-hydroxynaphthoic acid. | ___do___ | Red. |
| 38 | Para-nitraniline ⟶ anilide of the 1:4-hydroxynaphthoic acid | ___do___ | Red. |
| 39 | 2:5-dichloraniline ⟶ 2:3-hydroxynaphthoic acid-3'-benzoylaminoanilide | ___do___ | Red. |
| 40 | 2:5-dichloroaniline ⟶ arylide from 2:3-hydroxynaphthoic acid and 5-amino-benzimidazole. | ___do___ | Red. |
| 41 | 2:5-dichloraniline ⟶ arylide from 2:3-hydroxynaphthoic acid and 1-amino-4:5-phenylazimidobenzene. | ___do___ | Red. |
| 42 | 4-benzoylamino-2:5-diethoxy-1-amino-benzene ⟶ 2:3-hydroxyanthracene carboxylic acid anilide. | ___do___ | Brown. |
| 43 | 4-amino-3-methoxy-azobenzene ⟶ 1-methyl-4-hydroxyphenyl-3-carboxylic acid anilide. | ___do___ | Orange-brown. |
| 44 | 4.4'-diamino-2-methyl-5-methoxy-azo-benzene ⟶ 1-methyl-4-hydroxyphenyl-3-carboxylic acid anilide. | | Brown. |
| 45 | 2:5-dichloraniline ⟶ diarylide from 2:3-hydroxynaphthoic acid and 4:4'-diamino-3:3'-dimethoxydiphenyl. | ___do___ | Red. |
| 46 | 4-chloro-4'aminostilbene ⟶ 2:3-hydroxynaphthoic acid orthoanisidide | ___do___ | Red. |
| 47 | 2:5-dichloraniline ⟶ diarylide from 2:3-hydroxynaphthoic acid and 4:4-diaminostilbene. | ___do___ | Red. |
| 48 | 2:5-dichloraniline ⟶ diarylide from 2:3-hydroxynaphthoic acid and 4:4-diaminodiphenylmethane. | ___do___ | Red. |
| 49 | 1-amino-2-methyl-5-chlorobenzene ⟶ diarylide from 2:3-hydroxynaphthoic acid and 4:4'-diaminodiphenylether. | ___do___ | Red. |
| 50 | 2:5-dichloraniline ⟶ diarylide from 2:3-hydroxynaphthoic acid and 4:4'-diamino-2:2'-dimethyl-5:5'-dimethoxy-diphenylurea. | ___do___ | Brown-red. |
| 51 | 2:5-dichloraniline ⟶ diarylide from 2:3-hydroxynaphthoic acid and 4:4'-diamino-azoxybenzene. | ___do___ | Brown-red. |
| 52 | 2:5-dichloraniline ⟶ arylide from 2:3-hydroxynaphthoic acid and 4-amino-azobenzene. | ___do___ | Brown-red. |
| 53 | 2-(4'-amino)-phenyl-6-methyl-benzothiazol ⟶ 2:3-hydroxynaphthoic acid-anilide. | ___do___ | Red-orange. |
| 54 | 2:5-dichloraniline ⟶ diarylide from 2:3-hydroxynaphthoic acid and 2-(4'-amino-phenyl-6-amino-benzothiazol. | ___do___ | Brown. |
| 55 | 5-aminobenzimidazol ⟶ 2:3 hydroxynaphthoic acid-anilide | ___do___ | Orange. |
| 56 | 1-amino-4:5-phenylazimidobenzene ⟶ 2:3-hydroxynaphthoic acid-anilide | ___do___ | Red. |

The formulas of the products 9, 15, 20, 25, 29, 30, 39, 43, 44 are probably the following:

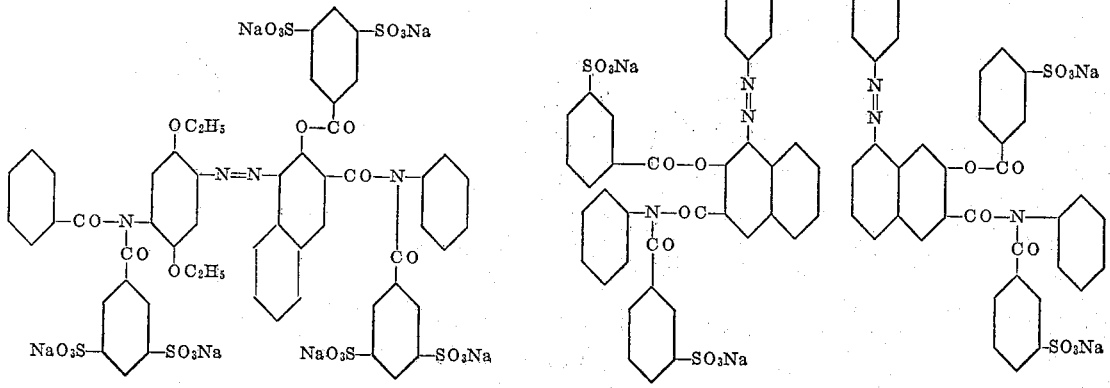

(9)

(15)

(20)
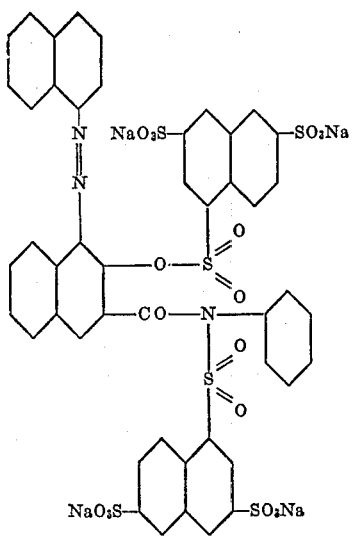
(30)
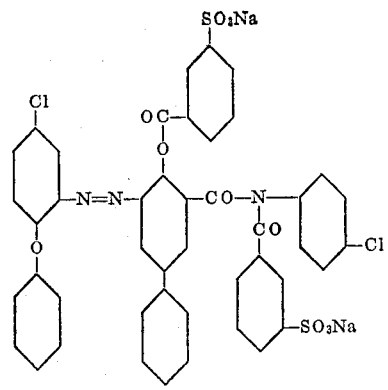
(25)
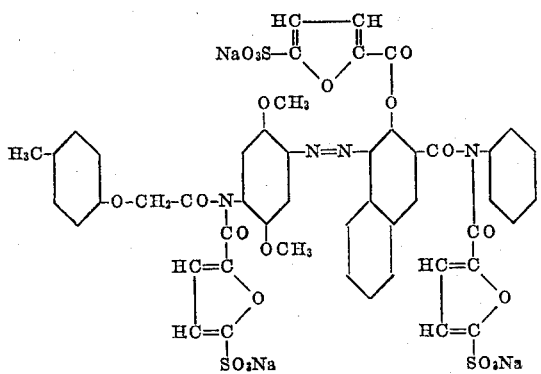
(39)
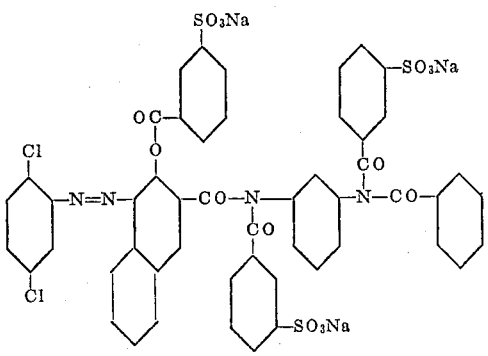
(29)
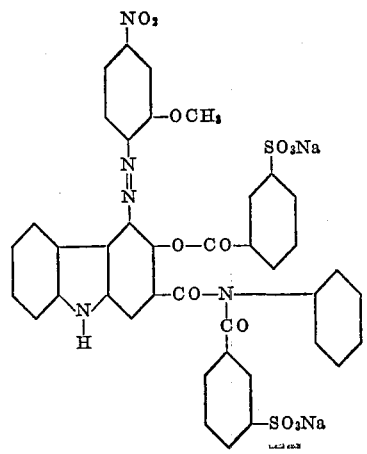
(43)
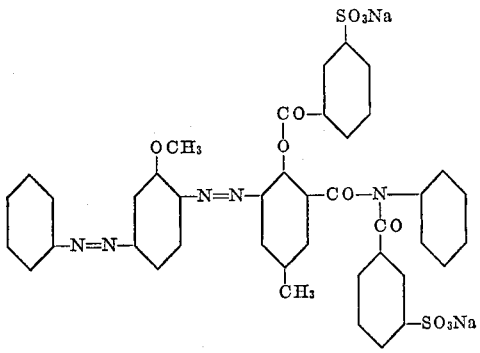
(44)
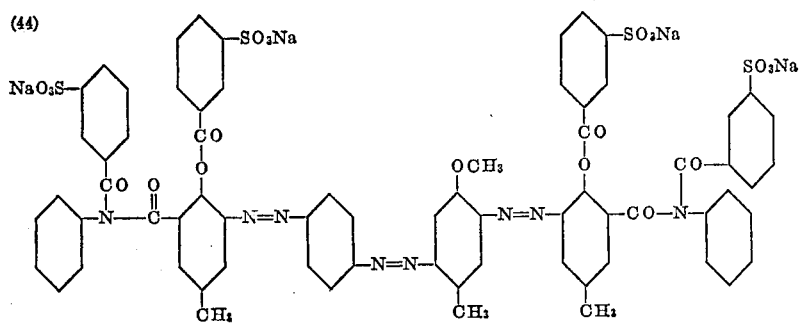

This application is a continuation-in-part of our Patents No. 2,170,262 of August 22, 1939, and No. 2,199,048 of April 30, 1940.

What we claim is:

1. The acyl derivatives of the azo-dyestuffs which are free from carboxyl groups and sulfonic groups and are characterized by the atomic grouping

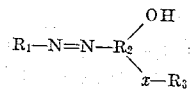

wherein $R_1$ and $R_3$ each stands for a radical comprising a plurality of nuclei which are selected from the group consisting of the nuclei of the benzene and of the naphthalene series and are connected by a bridge selected from the group consisting of the diphenyl linkage, the —CH=CH—, —CH$_2$—, —O—, —NH—, —NH—CO—NH, —NH—CO—,

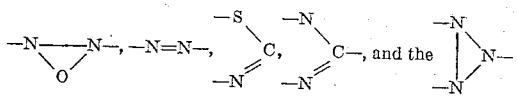

linkage, $R_2$ stands for the nuclear radical of an aromatic hydroxy carboxylic acid and $x$ stands for one of the two tautomeric forms

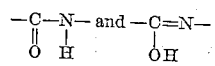

the carbon atom being linked to $R_2$, and wherein the azo-group and the OH-group stand in ortho-position to each other, in which acyl derivatives at least the two hydrogen atoms explicitly shown in the above formulation are replaced by the acyl radical of an organic acid which contains more than one salt-forming group from the group consisting of carboxyl and sulfonic groups, which acyl derivatives form alkali salts which are soluble in water with formation of solutions from which the insoluble parent azo-dyestuff can be precipitated by treatment with alkalies.

2. The acyl derivatives of the azo-dyestuffs which are free from carboxyl groups and sulfonic groups and are characterized by the atomic grouping

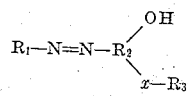

wherein $R_1$ and $R_3$ each stands for a radical comprising a plurality of nuclei which are selected from the group consisting of the nuclei of the benzene and of the naphthalene series and are connected by a bridge selected from the group consisting of the diphenyl linkage, the —CH=CH—, —CH$_2$—, —O—, —NH—, —NH—CO—NH, —NH—CO—,

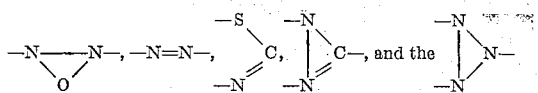

linkage, $R_2$ stands for the nuclear radical of an aromatic hydroxy-carboxylic acid and $x$ stands for one of the two tautomeric forms —CO—NH— and

the carbon atom being linked to $R_2$, and wherein the azo-group and the OH-group stand in the ortho-position to each other, in which acyl derivaties at least the two hydrogen atoms explicitly shown in the above formulation are replaced by the acyl radical of a benzene sulfocarboxylic acid which is united with the radical of the azo-dyestuff by its C=O group, which acyl derivatives form alkali salts which are soluble in water with formation of solutions from which the insoluble parent azo-dyestuff can be precipitated by treatment with alkalies.

3. The acyl derivatives of the azo-dyestuffs which are free from carboxyl groups and sulfonic groups and are characterized by the atomic grouping

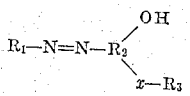

wherein $R_1$ and $R_3$ each stands for a radical comprising a plurality of nuclei which are selected from the group consisting of the nuclei of the benzene and of the naphthalene series and are connected by a bridge selected from the group consisting of the diphenyl linkage, the —CH=CH—, —CH$_2$—, —O—, —NH—, —NH—CO—NH—, —NH—CO—,

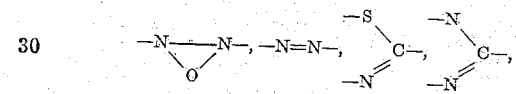

and the

linkage, $R_2$ stands for the nuclear radical of a polynuclear aromatic hydroxy-carboxylic acid, the azo-group and the

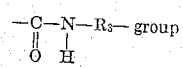

standing in the ortho-position to the OH-group, the $x$ stands for one of the two tautomeric forms

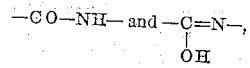

the carbon atom being linked to $R_2$ and in which acyl derivatives at least the two hydrogen atoms explicitly shown in the above formulation are replaced by the acyl radical of an organic acid which contains more than one salt-forming group from the group consisting of carboxyl and sulfonic groups, which acyl derivatives form alkali salts which are soluble in water with formation of solutions from which the insoluble parent azo-dyestuff can be precipitated by treatment with alkalies.

4. The acyl derivatives of the azo-dyestuffs which are free from carboxyl groups and sulfonic groups and are characterized by the atomic grouping

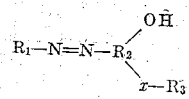

wherein $R_1$ and $R_3$ each stands for a radical comprising a plurality of nuclei which are selected from the nuclei of the benzene and of the naphthalene series and are connected by a bridge selected from the group consisting of the diphenyl linkage, the —CH=CH—, —CH₂—, —O—, —NH—, —NH—CO—NH—, —NH—CO—,

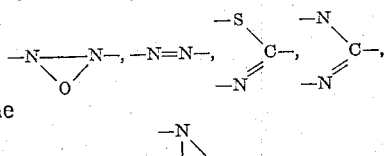

and the

linkage, R₂ stands for the nuclear radical of a polynuclear aromatic hydroxy-carboxylic acid, the azo-group and the

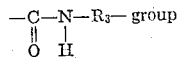

standing in the ortho-position to the OH-group, and $x$ stands for one of the two tautomeric forms

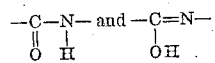

the carbon atom being linked to R₂, and in which acyl derivatives at least the two hydrogen atoms explicitly shown in the above formulation are replaced by the acyl radical of a benzene sulfocarboxylic acid which is united with the radical of the azo-dyestuff by its C=O group, which acyl derivatives form alkali salts which are soluble in water with formation of solutions from which the insoluble parent azo-dyestuff can be precipitated by treatment with alkalies.

5. The acyl derivatives of the azo-dyestuffs which are free from carboxyl groups and sulfonic groups and are characterized by the atomic grouping

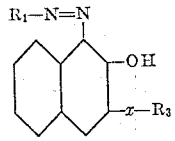

wherein R₁ and R₃ each stands for a radical comprising a plurality of nuclei which are selected from the group consisting of the nuclei of the benzene and of the naphthalene series and are connected by a bridge selected from the group consisting of the diphenyl linkage, the —CH=CH—, —CH₂—, —O—, —NH—, —NH—CO—NH—, —NH—CO—,

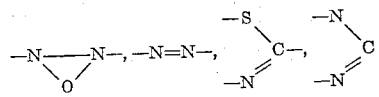

and the

linkage, and $x$ stands for one of the two tautomeric forms —CO—NH— and

the nitrogen atom being linked to R₃ and in which acyl derivative at least the two hydrogen atoms explicitly shown in the above formulation are replaced by the acyl radical of an organic acid which contains more than one salt-forming group from the group consisting of carboxyl and sulfonic groups, which acyl derivatives form alkali salts which are soluble in water with formation of solutions from which the insoluble parent azo-dyestuff can be precipitated by treatment with alkalies.

6. The acyl derivatives of the azo-dyestuffs which are free from carboxyl groups and sulfonic groups and are characterized by the atomic grouping

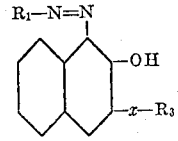

wherein R₁ and R₃ each stands for a radical comprising a plurality of nuclei which are selected from the group consisting of the nuclei of the benzene and of the naphthalene series and are connected by a bridge selected from the group consisting of the diphenyl linkage, the —CH=CH—, —CH₂—, —O—, —NH—, —NH—CO—NH—, —NH—CO—,

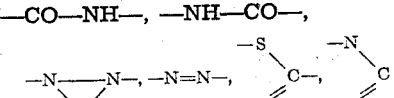

and the

linkage, and $x$ stands for one of the two tautomeric forms —CO—NH— and

the nitrogen atom being linked to R₃, and in which acyl derivatives at least the two hydrogen atoms explicitly shown in the above formulation are replaced by the acyl radical of a sulfocarboxylic acid which is united with the radical of the azo-dyestuff by its C=O-group, which acyl derivatives form alkali salts which are soluble in water with formation of solutions from which the insoluble parent azo-dyestuff can be precipitated by treatment with alkalies.

7. The acyl derivatives of the azo-dyestuffs which are free from carboxyl groups and sulfonic groups and are characterized by the atomic grouping

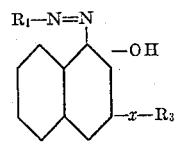

wherein R₁ and R₃ each stands for a radical comprising a plurality of nuclei which are selected from the group consisting of the nuclei of the benzene and of the naphthalene series and are connected by a bridge selected from the group consisting of the diphenyl linkage, the —CH=CH—, —CH₂—, —O—, —NH—, —NH—CO—NH—, —NH—CO—,

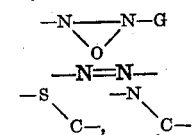

and the

linkage, and $x$ stands for one of the two tautomeric forms —CO—NH— and

the nitrogen atom being linked to $R_3$, and in which acyl derivatives at least the two hydrogen atoms explicitly shown in the above formulation are replaced by the acyl radical of a benzene sulfocarboxylic acid which is united with the radical of the azo-dyestuff by its C=O-group, which acyl derivatives form alkali salts which are soluble in water with formation of solutions from which the insoluble parent azo-dyestuff can be precipitated by treatment with alkalies.

8. The acyl derivatives of the azo-dyestuffs which are free from carboxyl groups and sulfonic groups and are characterized by the atomic grouping

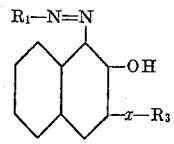

wherein $R_1$ and $R_3$ each stands for a radical comprising a plurality of nuclei which are selected from the group consisting of the nuclei of the benzene and of the naphthalene series and are connected by a bridge selected from the group consisting of the diphenyl linkage, the —CH=CH—, —CH$_2$—, —O—, —NH—, —NH—CO—NH—, —NH—CO—,

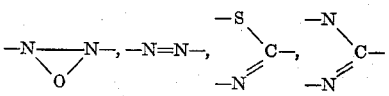

and the

linkage, and $x$ stands for one of the two tautomeric forms —CO—NH— and

the nitrogen atom being linked to $R_3$, and in which acyl derivatives at least the two hydrogen atoms explicitly shown in the above formulation are replaced by the acyl radical of a benzoic-3-sulfonic acid which is united with the radical of the azo-dyestuff by its C=O-group, which acyl derivatives form alkali salts which are soluble in water with formation of solutions from which the insoluble parent azo-dyestuff can be precipitated by treatment with alkalies.

CHARLES GRAENACHER.
FRANZ ACKERMANN.
HEINRICH BRUENGGER.